United States Patent [19]
Takahashi et al.

[11] 3,710,219
[45] Jan. 9, 1973

[54] SPEED CONTROL SYSTEM FOR DC MOTORS

[75] Inventors: Tadashi Takahashi; Kazuo Onishi, both of Hitachi, Japan

[73] Assignee: Hitachi, Ltd., Tokyo, Japan

[22] Filed: April 6, 1970

[21] Appl. No.: 25,979

[30] Foreign Application Priority Data

April 11, 1969 Japan..................................44/27658

[52] U.S. Cl................................................318/331
[51] Int. Cl.............................................H02p 5/16
[58] Field of Search....................318/331, 332, 345

[56] References Cited

UNITED STATES PATENTS

| 3,309,596 | 3/1967 | Limley | 318/345 |
| 3,440,511 | 4/1969 | Igarashi | 318/331 |
| 3,521,140 | 7/1970 | Kobayashi | 318/331 |

Primary Examiner—Bernard A. Gilheany
Assistant Examiner—Thomas Langer
Attorney—Craig, Antonelli and Hill

[57] ABSTRACT

A speed control system for a DC motor comprising a bridge circuit including a first resistor connected in series with an armature, a second and a third resistor connected in series with each other and in parallel with the first series resistor circuit, whereby the amount of bias voltage provided between the detection terminals of the bridge circuit is applied to the base-emitter of a transistor in differential relationship with a reference voltage to thereby control the feed voltage of the bridge circuit in accordance with the collector current of the transistor, characterized by the provision of a resistor connected in series with the base of the transistor, and a resistor connected in parallel with the base-emitter of the transistor.

5 Claims, 2 Drawing Figures

PATENTED JAN 9 1973

3,710,219

INVENTORS

TADASHI TAKAHASHI and KAZUO ONISHI

BY Craig, Antonelli, Stewart & Hill
ATTORNEYS though the detailed description of the invention which follows.

SPEED CONTROL SYSTEM FOR DC MOTORS

BACKGROUND OF THE INVENTION

This invention relates to a speed control system for a DC motor.

In such a control system, if a bridge circuit includes the armature of a motor to be controlled as an arm, the detection terminals of the bridge circuit can provide a bias voltage in accordance with the speed of the armature. Therefore, if such a bias voltage is compared with a reference voltage so that the source voltage for the bridge circuit may be controlled so as to provide a predetermined difference from the reference voltage, then the number of revolutions of the armature can be maintained at a predetermined value. Such a control system is already known in the art. With such a control system, the speed of the armature can be set up by selecting the magnitude of the reference voltage so as to be a value corresponding to the magnitude of the bias voltage obtained from the bridge circuit at the desired speed of the motor. The control system of the type in which the reference voltage is varied, however, requires the use of a separate power source for providing the reference voltage or a complicated circuit arrangement if the reference voltage is provided by the motor's power source through a Zener diode.

According to another known technique for setting up the speed of the armature in the speed control system for a DC motor using a bridge circuit, the resistances of the bridge arms are selected so that the bridge circuit is balanced at the desired number of revolutions. In such a system, however, the bridge circuit becomes out of balance when the armature is locked, and this adversely affects the voltage as well as the load characteristics.

According to still another known technique for setting up a desired speed in the speed control system for a DC motor using a bridge circuit, a variable resistor is connected between the detection terminals of the bridge circuit to absorb any bias voltage to thereby reduce the detection terminal voltage with respect to the variation in the speed. With this system, however, if the variable resistor has a small resistance value, the control sensitivity is reduced while the current flowing through the resistor during the operation is increased, with the same undesirable result as it will be if the bridge circuit gets out of balance.

SUMMARY OF THE INVENTION

It is an object of the present invention to provide a speed control system which can provide a stable control characteristic for any desired speed set up.

It is another object of the present invention to provide a speed control system which can set up a desired speed over a wide range.

It is still another object of the present invention to provide a speed control system which is excellent in voltage as well as load characteristics for any desired speed set up over a wide range.

Other objects and features of the present invention will be clearly understood from the detailed description of the invention which follows.

According to the present invention, the speed control system can set up a desired speed while the bridge circuit including the armature of the motor to be controlled as an arm is substantially maintained in a balanced state, and more specifically it is characterized in that a serial resistor is connected with the base of a detection transistor connected between the detection terminals of the bridge circuit and that a shunt resistor is connected between the base and emitter of the same transistor.

DETAILED DESCRIPTION OF THE PREFERRED EMBODIMENTS

Figure 1:
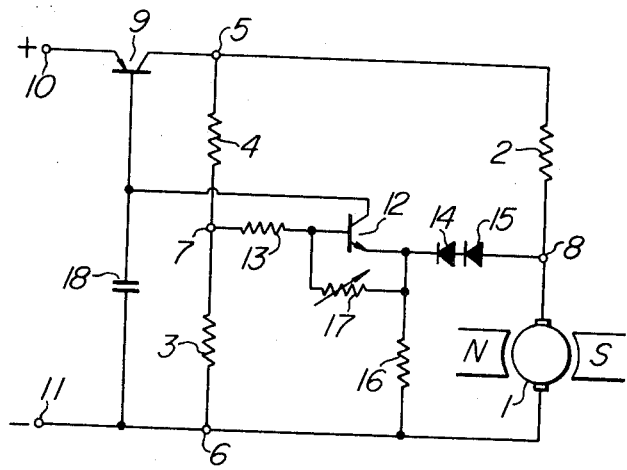
FIG. 1 is an electric circuit diagram showing an embodiment of the speed control system according to the present invention.

Referring to FIG. 1, the electric circuit of the speed control system according to the present invention includes a bridge circuit constituted by the armature winding 1 of the motor to be controlled, a resistor 2 connected in series with the armature 1, and resistors 3 and 4 connected in series with each other and in parallel with the serial circuit including the resistor 2. The bridge circuit is provided with feed terminals 5 and 6 and detection terminals 7 and 8. The resistance values of the resistors 2, 3 and 4 are selected so that the bridge circuit assumes a balanced (resistor-balanced) state when the armature 1 is locked, but desirably the resistance value of the resistor 2 should be considerably small because it must pass a load current therethrough. The feed terminal 5 is connected with the collector of an PNP transistor (or control transistor) 9 whose emitter is connected with a positive power terminal 10. The feed terminal 6 is connected with a negative power terminal 11. An NPN transistor (or detection transistor) 12 has the base thereof connected with the detection terminal 7 through a resistor 13, and the emitter connected with the detection terminal 8 through backwardly directed diodes 14 and 15 and with the feed terminal 6 through a resistor 16. A variable resistor 17 is connected in parallel with the emitter-base channel of the transistor 12. The collector of the transistor 12 is connected with the base of the control transistor 9. An electromotive force compensating capacitor 18 is connected between the base of the control transistor 9 and the power source terminal 11.

Since the resistors 3 and 4 in the bridge circuit form a voltage arm, the resistances thereof should be selected to be considerably high with respect to the resistance of the current arm formed by the armature 1 and resistor 2 so as to minimize the power loss. Actually, however, a current for controlling the transistor 12 flows from the detection terminal 7 through the resistor 13, and therefore, the resistance values of the resistors 3 and 4 are in fact selected to be such values that the current flowing through these resistors are not substantially influenced by the aforesaid control current. Further, the armature 1 has a resistance value of several ohms and therefore, if the resistance value of the resistor 16 is selected to be several kilo-ohms, any substantial influence upon the bridge circuit can be avoided.

It will be remembered that the relationship between the armature 1 and the resistors 2, 3 and 4 has been selected so that the bridge circuit is resistor-balanced. If a voltage is applied to the power source terminals 10 and 11 with the armature 1 being locked, then a current for charging the capacitor 18 flows through the emitter-base of the transistor 9 so that this makes the transistor conductive to thereby apply a voltage to the feed terminals 5 and 6 in the bridge circuit. However, as the bridge circuit is resistor-balanced no voltage difference occurs even if a voltage of any magnitude is imparted between the detection terminals 7 and 8. However, if the resistance value of the resistor 13 is selected so that the forward voltage drop Ed (XZ) of the diodes 14 and 15 is greater than the voltage drop $E_{13}$ of the resistor 13, then a forward bias voltage is applied between the emitter and base of the transistor 12. When this bias voltage is greater than the barrier voltage, a base current Ib is allowed to flow so as to render the transistor 12 conductive, and thereby the base current of the transistor 9 is maintained to admit the source voltage.

When the armature 1 is released from its locked state, it starts rotating against the load. This produces a counter electromotive force Ec in proportion to the speed N of the armature 1 so that the voltage division between the armature 1 and resistor 2 is varied to bring the bridge circuit out of balance and produce a differential voltage Eo between the detection terminals 7 and 8.

Assuming that the potential of the feed terminal 6 is a base potential, the voltage distribution for the locked state of the armature 1 may be expressed as:

$$E_7 = E_5 [R_3/(R_3 + R_4)] \quad (1)$$

$$E_8 = E_5 [R_1/(R_1 + R_2)] \quad (2),$$

where
$E_5$ : voltage at the feed terminal 5
$R_1$ : resistance value of the armature 1
$R_2$ : resistance value of the resistor 2
$R_3$ : resistance value of the resistor 3
$R_4$ : resistance value of the resistor 4.

As the bridge circuit is resistor-balanced, $R_1R_4 = R_2R_3$; hence the differential voltage $Eo = E_7 - E_8 = 0$.

When the armature 1 is released from its locked state, the armature starts rotating and produces a counter electromotive force Ec in proportion to the speed N of the armature to thereby vary the voltage $E_8$ at the detection terminal 8. Hence, $$E_8' = (R_1E_5 + EcR_2)/(R_1 + R_2) \quad (3)$$

As the result, the differential voltage Eo between the detection terminals 7 and 8 will be:

$$Eo = E_7 - E_8' = EcR_2/(R_1 + R_2) \quad (4)$$

If the field flux is constant as in the case of a magneto motor, the counter electromotive force Ec of the armature 1 is $Ec = KN$, and therefore, $$N = [Eo (R_1 + R_2)]/KR_2 = K'Eo \quad (5)$$

where $$K' = (R_1 + R_2)/KR_2$$

On the other hand, the differential voltage Eo between the detection terminal 7 and 8 is applied between the emitter and base of the detection transistor 12 to control the same transistor, and therefore the voltage distribution will be:

$$Eo = 2Ed - E_{BE} - R_{13} (E_{BE}/R_{17} + I_B) \quad (6)$$

where

Ed : forward voltage drop in the diode 14 (15)
$E_{BE}$ : base-emitter voltage of the transistor 12
$R_{13}$ : resistance value of the resistor 13
$R_{17}$ : resistance value of the resistor 17
$I_B$ : base current of the transistor 12.

From the equation (5), the following relation is established:

$$N = K' [2Ed - E_{BE} - R_{13} (E_{BE}/R_{17} + I_B)] \quad (7)$$

However, since the forward voltage drop Ed in the diode 14 (15) is substantially constant in the normal operating range independently of the current and the voltage $E_{BE}$ between the base and emitter of the transistor 12 is also substantially constant, the speed N of the armature 1 varies in inverse relationship with the base current $I_B$. The base current $I_B$ is amplified by the transistor 12 to provide a control current for the control transistor 9 which controls the voltage $E_5$ at the feed terminal 5. The increased base current $I_B$ results in increased voltage $E_5$ at feed terminal 5, until a balanced state is reached.

Assume that the speed of the armature 1 which is N with the base current $I_B$ is increased to N' for some reason or other. Then the base current $I_B$ is decreased to $I_B'$ so as to satisfy the equation (7). With the decrease of the base current $I_B$ the collector current of the transistor 12 is also decreased to reduce the conductivity of the transistor 9, so that the voltage $E_5$ at the feed terminal 5 is decreased to reduce the speed of the armature 1.

If the speed N then falls to N'', the base current $I_B$ is increased to $I_B''$ so as to satisfy the equation (7). This increment of the base current increases the conductivity of the transistor 9 to thereby increase the voltage $E_5$ at the feed terminal 5 and accelerate the armature 1.

In this way the speed N of the armature 1 is controlled to the same state as the initial stable state.

Description will now be made of the manner in which a desired speed N is set up. Since the base current $I_B$ required to control the transistor 12 is of a very small value, if $E_{BE}/R_{17} >> I_B$ and the base-emitter voltage $E_{BE}$ of the transistor 12 is equal to the forward voltage drop Ed in the diode 14 (15), then the equation (7) will become:

$$N \approx K'Ed (1 - R_{13}/R_{17}) \quad (8)$$

Consequently, a desired speed N can be set up by adjusting the value of $R_{13}/R_{17}$ within a range of less than 1. In this case the maximum speed Nmax equals $K'Ed$, but if a higher value of Nmax is required, it can be attained by providing an additional diode connected in series with the diodes 14 and 15. However, the equation (8) presupposes that the forward voltage drop Ed in the diode 14 (15) is substantially equal to the voltage drop $E_{BE}$ in the base-emitter of the transistor 12, and therefore, if the voltage 2Ed is to be produced by a different means, the desired speed N can be set to any value by using the equation (7). In that case, 2Ed must be invariable with respect to any variation in the source voltage because it provides the reference voltage. In the illustrated embodiment, it will be appreciated that the same setting as described above can be accomplished, even if the resistor 17 is a variable one.

Figure 2:
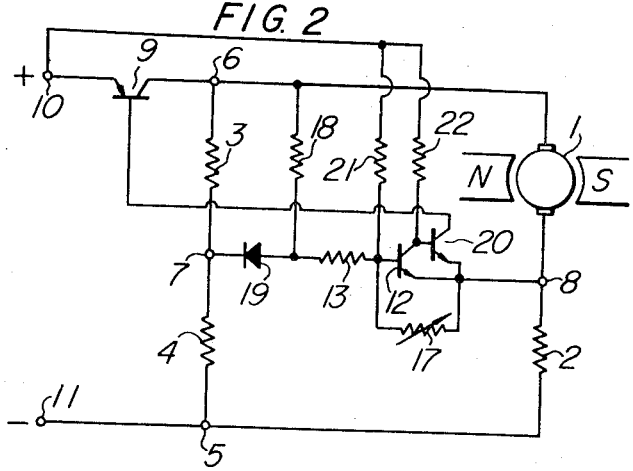
FIG. 2 is an electric circuit diagram showing another embodiment of the speed control system according to the present invention.

Referring to FIG. 2, there is shown another embodiment of the present invention. In this alternative example, the feed terminal 5 of the bridge circuit is connected with a power source terminal 11 and the feed terminal 6 is connected with the collector of a control transistor 9. A serial connection of a resistor 18 and a diode 19 is connected in parallel with a resistor 3 so that the cathode of the diode 19 is connected with a detection terminal 7. The resistance values of the resistors are selected so that the bridge circuit including these resistors may be resistor-balanced. The anode of a diode 14 is connected with the base of an NPN type detection transistor 12 through a resistor 13, and the emitter of the transistor 12 is connected with a detection terminal 8. A variable resistor 17 is connected in parallel with the base-emitter of the transistor 12. An NPN type reversing transistor 20 has the base thereof connected with the collector of the transistor 12. The emitter of the transistor 20 is connected in common with the emitter of the transistor 12 and the collector thereof is connected with the base of the control transistor 9. The bases of the transistors 12 and 20 are connected with a power source terminal 10 through large bias resistors 21 and 22 respectively.

In this arrangement, the bridge circuit is set so that it is resistor-balanced with the armature 1 being locked and therefore, even if a voltage is applied between the feed terminals 5 and 6 of the bridge circuit, the voltage difference between the detection terminals 7 and 8 will be zero, irrespective of the magnitude of the voltage applied to the feed terminals 5 and 6. On the other hand, the voltage $E_{BE}$ applied to the base-emitter of the transistor 12 cannot be high enough to allow a current to flow in the base-emitter channel because the forward voltage drop $E_d$ in the diode 19 is substantially equal to the barrier voltage of the transistor 12. Thus, the transistor 12 is maintained non-conductive and as a result, the transistors 20 and 9 are rendered conductive so that the voltage $E_6$ at the feed terminal 6 of the bridge circuit provides the source voltage.

If the armature 1 is released from its locked state, it starts rotating against the load. This produces a counter electromotive force $Ec$ in proportion to the speed $N$ of the armature 1 to thereby vary the voltage distribution in the armature circuit and produce a differential voltage $Eo$ between the detection terminals 7 and 8.

Thus, if the potential of the feed terminal 6 is assumed as the base potential, the voltage distribution for the locked state of the armature 1 will be expressed as:

$$E_7 = -E_5 [R_3'/(R_3' + R_4)] \quad (1')$$

$$E_8 = -E_5 [R_1/(R_1 + R_2)] \quad (2')$$

where $R_3'$ represents a composite resistance consisting of the resistances of the resistor 23 and diode 19 and the resistor 3. In the bridge circuit, $R_1 R_4 = R_2 R_3'$, hence the differential voltage becomes: $Eo = E_7 - E_8 = 0$.

If the armature 1 is released from its locked state to produce a counter electromotive force $Ec$, the detection terminal voltage $E_8'$ will be:

$$E_8' = (-E_5 R_1 - Ec R_2)/(R_1 + R_2) \quad (3')$$

Hence, the differential voltage $Eo$ between the detection terminals 7 and 8 will be:

$$Eo = E_7 - E_8' = -Ec R_2/(R_1 + R_2) \quad (4')$$

Since the counter electromotive force $Ec$ is $KN$, $$N = -[Eo(R_1 + R_2)/KR_2] = K''Eo \quad (5')$$

where $$K'' = -[(R_1 + R_2)/KR_2]$$

On the other hand, the differential voltage $Eo$ between the detection terminals 7 and 8 is applied across the base-emitter channel of the detection transistor 12 to control the same transistor, and therefore the voltage distribution in this channel will be:

$$Eo = E_D - E_{BE} - R_{13}[(E_{BE}/R_{17}) + I_B] \quad (6')$$

From the equation (5'), the following relation is established:

$$N = K''[E_D - E_{BE} - R_{13}(E_{BE}/R_{17} + I_B)] \quad (7')$$

Since the forward voltage drop in the diode 19 and the voltage $E_{BE}$ in the base-emitter of the transistor 12 are substantially constant, the speed $N$ of the armature varies in proportion to the base current $I_B$. The base current $I_B$ is amplified and thereafter reversed by the transistor 20, and thus the voltage $E_5$ at the feed terminal 5 is controlled in the same manner as described with respect to the FIG. 1 embodiment.

Also, if $E_{BE}/R_{17} \gg I_B$, the equation (7') will become:

$$N \approx -K'(R_{13}/R_{17})E_{BE} \quad (8')$$

Therefore, a desired speed $N$ can be set up by adjusting the value of $R_{13}/R_{17}$.

While the present invention has been described with respect to the case where use is made of NPN type transistors, it will be readily understood by those skilled in the art that PNP type transistors may also be used with the present invention to attain the same result.

What We claim is:

1. A speed control system for a DC motor, comprising a resistor bridge circuit having an armature as one of the arms thereof and being balanced with said armature locked, voltage supply means connected to said bridge for supplying a voltage to the feed terminals thereof, transistor circuit means including at least one transistor connected across the detection terminals for comparing the differential voltage between the detection terminals of said bridge circuit with a reference voltage, a first resistor connected in series with the base of said transistor to one detection terminal, and a second resistor connected between the base and the emitter of said transistor so that the current through said first resistor passes mainly through said second resistor, and means for controlling said voltage supply means so as to regulate the feed terminal voltage of said bridge circuit in accordance with the output of said transistor.

2. A speed control system as defined in claim 1, wherein at least one of said resistor connected in series with the base of said transistor and said resistor connected between the base and the emitter of said transistor is of a variable type.

3. In a speed control system for a DC motor including a bridge circuit having an armature as one of the arms thereof and being balanced with said armature locked, a voltage source providing a feed terminal voltage to said bridge circuit, and control means for controlling the feed terminal voltage supplied to said bridge circuit regulation means for regulating said control means in accordance with the detection terminal voltage of said bridge circuit, comprising a transistor, first circuit means for connecting the base of said transistor with the detection terminal of the branch of said bridge circuit not including said armature, second circuit means for connecting the emitter of said transistor with the detection terminal of the branch of said bridge circuit including said armature, at least one of said first and second circuit means including a constant-voltage circuit for biasing the detection terminal voltage by a predetermined constant voltage in the forward direction with respect to the base-emitter channel of said transistor, a first resistor connected in series with the base of said transistor, and a second resistor connected between the base and the emitter of said transistor so that the current through said first resistor passes mainly through said second resistor.

4. A speed control system for a DC motor comprising a resistor bridge circuit having an armature as one of the arms and arranged so as to be balanced with said armature being locked, a detection transistor, means providing a constant voltage drop connected between the detection terminal of a branch including said armature of said resistor bridge circuit and the emitter of said detection transistor, a first resistor connected between the branch of said bridge circuit not including said armature and the base of said detection transistor, a second resistor connected between the base and the emitter of said transistor so that the current through said first resistor passes mainly through said second resistor, and means for controlling the feed terminal voltage of said resistor bridge circuit in accordance with the collector current of said detection transistor.

5. A speed control system for a DC motor comprising a resistor bridge circuit having an armature as one of the arms thereof and being balanced with said armature locked, a detection transistor, a first circuit for connecting the emitter of said detection transistor with the detection terminal of the branch of said bridge circuit including said armature, constant-voltage means for biasing the detection terminal voltage of the branch of said bridge circuit not including said armature in the forward direction with respect to the base-emitter channel of said detection transistor, said constant-voltage means being connected to the detection terminal of said branch not including said armature, a first resistor for connecting the base of said detection transistor with said constant-voltage means, a second resistor connected between the base and the emitter of said detection transistor so that the current through said first resistor passes mainly through said second resistor, and means for controlling the feed terminal voltage of said bridge circuit in accordance with the collector current of said detection transistor.

* * * * *